(12) United States Patent
Li et al.

(10) Patent No.: US 10,288,319 B2
(45) Date of Patent: May 14, 2019

(54) COLOR STEEL TILE FIXTURE (71) Applicant: Jiangsu Chiko Solar Co., Ltd., Suqian, Jiangsu (CN)

(72) Inventors: Jinbei Li, Jiangsu (CN); Yuanling Lin, Fujian (CN)

(73) Assignee: Jiangsu Chiko Solar Co., Ltd., Suqian (CN)

( * ) Notice: Subject to any disclaimer, the term of this patent is extended or adjusted under 35 U.S.C. 154(b) by 266 days.

(21) Appl. No.: 15/381,062

(22) Filed: Dec. 15, 2016

(65) Prior Publication Data
US 2018/0135891 A1    May 17, 2018

(30) Foreign Application Priority Data

Nov. 16, 2016 (CN) .......................... 2016 1 1008493

(51) Int. Cl.
*E04B 1/38* (2006.01)
*F24S 25/636* (2018.01)
*H02S 20/23* (2014.01)
*F24S 25/615* (2018.01)
*F24S 25/60* (2018.01)

(52) U.S. Cl.
CPC .......... *F24S 25/636* (2018.05); *F24S 25/615* (2018.05); *H02S 20/23* (2014.12); *F24S 2025/6003* (2018.05); *Y02B 10/20* (2013.01)

(58) Field of Classification Search
CPC ....... F24S 25/615; F24S 25/636; H02S 20/23; H02S 20/25; Y02E 10/47
See application file for complete search history.

(56) References Cited

U.S. PATENT DOCUMENTS

| 8,070,119 B2* | 12/2011 | Taylor | E04G 21/3261 248/237 |
| 8,251,326 B2* | 8/2012 | McPheeters | E04D 13/1476 248/228.2 |
| 8,341,917 B2* | 1/2013 | Resso | E04D 3/366 52/741.4 |
| 8,528,888 B2* | 9/2013 | Header | E04D 13/10 269/91 |
| 8,756,870 B2* | 6/2014 | Teller | E04D 13/10 52/24 |

(Continued)

FOREIGN PATENT DOCUMENTS

CN          203911846 U      10/2014

*Primary Examiner* — Joshua T Kennedy (57) ABSTRACT

A color steel tile fixture includes a limit part having a limit groove; a clamping assembly including two opposite clamping parts which are each equipped with, from top to bottom in sequence, a clamping head, a bump defining a slope, and a clamping splice; a connecting block provided with a threaded hole and two opposite arc grooves on either side of the threaded hole, the clamping head of each clamping part being rotatably engaged in a respective arc groove of the two opposite arc grooves; a threaded part which is screwed into the threaded hole; and a connecting part. When the threaded part is screwed, the connecting block moves upward along the threaded part causing side panels of the limit groove to engage the slopes of the bumps, so that the clamping parts are biased inwardly such that the clamping splices are configured to clamp a color steel tile.

15 Claims, 5 Drawing Sheets

(56) References Cited

U.S. PATENT DOCUMENTS

| | | | | |
|---|---|---|---|---|
| 8,769,911 | B2* | 7/2014 | Montgomery | E04G 21/3261 |
| | | | | 52/705 |
| 8,910,928 | B2* | 12/2014 | Header | E04D 13/10 |
| | | | | 269/91 |
| 9,011,034 | B2* | 4/2015 | Liu | F16B 2/065 |
| | | | | 403/256 |
| 2002/0035811 | A1* | 3/2002 | Heuel | E04D 13/10 |
| | | | | 52/506.05 |
| 2013/0168525 | A1* | 7/2013 | Haddock | E04D 13/10 |
| | | | | 248/505 |
| 2017/0338768 | A1* | 11/2017 | Prakash | H02S 20/23 |

* cited by examiner

COLOR STEEL TILE FIXTURE

CROSS-REFERENCE TO PRIOR APPLICATION

The present application claims the benefit of Chinese Patent Application No. 201611008493.9 filed on Nov. 16, 2016, the contents of which are incorporated herein by reference.

TECHNICAL FIELD

The Invention relates to a fixture, in particular to a color steel tile fixture.

BACKGROUND ART

As the international community pays more attention to energy conservation and emission reduction, the solar energy products are becoming more and more popular. Photovoltaic power generation is applied more and more extensively. In order to use the solar panel more effectively, safely and conveniently, an effective fixture must be provided for the solar panel.

At present, the color steel tile is used as the base plate to install the solar panel on the roof of many buildings. The solar panel is installed in such way that the bolt is screwed through the mounting rack of the solar panel and color steel tile and fixed on the internal beam of the building. However, the following deficiencies are found in the fixed mode:

1. The overall strength of the color steel tile will be inevitably weakened by the through-hole required to be arranged on the color steel tile;

2. Such tools as electric portable drill are required when the through-hole is prepared on the color steel tile, which makes the installation process extremely inconvenient;

3. It is likely to damage the roofing waterproof and preservative effects, leading to a corrosive and rusty color steel tile, when the through-hole is arranged on the color steel tile roofing;

4. Even if adhesive repair is performed after punching on the color steel tile, it is hard to achieve the original waterproof and preservative effects and the construction cost is high.

A technique of color steel tile fixture (CN203911846U, published on Oct. 29, 2014) has emerged. However, it only relies on the unidirectional transverse clamping force provided by the bolt, which makes the surface of the color steel tile damaged and the color steel tile rusty. Meanwhile, affected by long-term wind load and snow load, the horizontal bolt is likely to loosen, leading to the bad effect for long-term application.

SUMMARY OF THE INVENTION

To solve the above technical problems, the invention is to provide a color steel tile fixture with stable and good clamping effect when applied in a long term.

The technical solution applied is:

a color steel tile fixture, including:

a limit part, which is provided with a limit groove;

a clamping assembly, comprising two opposite clamping parts which are equipped with a clamping head, a bump with a slope against an groove arm of limit groove and a clamping splice from top to bottom in sequence;

a connecting block, which is located in the limit groove and provided with threaded holes and two opposite arc grooves; the clamping head is rotatably engaged in the arc groove;

a threaded part, which is screwed into the threaded hole; when the threaded part is screwed, the connecting block moves upward or downward relative to the threaded part, so that the slope shrinks inward or stretches outward relative to the arm and the two clamping splices are clamped tightly or loosened; and a connecting part, which is fixed on the limit part.

In the above solution, the threaded part is screwed and used as the power part to make the clamping splice clamped or loosened; the applied force between the arm and the slope provides a transverse clamping force for the clamping splice so that the two clamping splices can completely clamp the color steel tile. The two forces applied on the two slopes in the opposite direction provide the two opposite transverse clamping forces against the color steel tile and extrude the color steel tile in the middle, which is more stable compared to the current unidirectional transverse clamping force and brings better effect for long-term use.

The threaded part can be a screw or a bolt or a part with screw or of bolt shape, preferably a bolt, which is easy to get and use. The number of the threaded part such as the bolt is not limited. For example, the number can be one or two or more based on actual demand.

Further, the limit part includes a transverse panel and two side panels on both ends of the transverse panel which form the limit groove together; the transverse panel is provided with a first through-hole where the bolt is screwed into the threaded-hole. Therefore, the transverse panel and the two side panels form a reversed U shape and the two side panels become the two arms of the limit groove. The transverse panel and the two side panels can be fixed separately or integrally. The integral forming is easy for production and manufacturing.

Further, there is a gap between the connecting block and the transverse panel when the two clamping splices are in contact with each other and clamped tightly. Namely, there is still a gap between the connecting block and the transverse panel when nothing is clamped between the two clamping splices. Therefore, the large accommodation space may be left in the limit groove, allowing the connecting block to move up and down in the limit groove and not limited by the transverse panel. Due to the large transverse clamping force, the two clamping splices can clamp color steel tiles in different wall thickness, width or types.

Further, a sloped or an arc-structure bump is provided on the tail end of interior side panel where the slope can be leaned against. In this way, the bump serves as a fulcrum when the slope moves. The slope leaned against the fulcrum moves upward and turns clockwise for shrinkage or moves downward and turns anticlockwise for stretch.

Further, the color steel tile fixture is also provided with a stopper which includes a cover plate with a second through-hole and two baffles on both ends of the cover plate. The cover plate is placed on the connecting block; the second through-hole matches with the threaded hole vertically and the baffles block out the arc groove. In this way, the cover plate and the two baffles also form a reverse U shape. The two baffles block out the two sides of the arc groove so as to limit the clamping head in the arc groove and prevent the head from moving out of the groove.

Further, the connecting part can be used to connect the solar energy rack, only if the shape and the structure are applicable for the solar energy rack. Including but not limited to the following:

As the first solution, the connecting part is an L-shaped part of which the transverse end is fixed on the transverse panel. The transverse end is provided with a third through-hole which matches with the first through-hole vertically. The vertical end of the connecting part is provided with a waved surface and a fourth through-hole. The waved surface is convenient as a handle.

As the second solution, the connecting part is an I-shaped part and integrated on the transverse panel. The connecting part is provided with the through-hole and the waved surface.

As the third solution, the connecting part is a U-shaped part with a U-shaped groove. The U-shaped part is integrated on the transverse panel; a fifth through-hole is provided inside the U-shaped groove and matches with the first through-hole vertically. The bolt is screwed through the fifth and the first through-holes in sequence.

The connecting parts in Solution I and Solution II connect to the solar energy rack at the side, while the connecting part in Solution III can connect with the guide rail of corresponding structure of the solar energy rack.

Further, the color steel tile fixture also includes a flat washer and an elastic washer. The threaded part is screwed into the threaded hole through the elastic washer, the flat washer and the first through-hole in sequence. The flat washer and the elastic washer are used to protect the bolt and the limit part, to prevent direct friction on the limit part by the threaded part when clamping and to provide airtightness and buffering power in case of loosening.

Further, the place where the clamping splice is used can be a point, a line or a surface. The point is a large convex point or several small convex points; the line is a continuous line or several broken lines; the surface is a flat surface or a serrated surface, which can be chosen based on actual demand. To increase the friction of the clamping part, it is better, but it is not limited to choose several small convex points and serrated surface.

Further, the clamping part is provided with a supporting part which is integrated under the clamping splice. The supporting part is used for supporting the color steel tile so as to further stabilize the structure. The shape of the supporting part can be adapted to that of the color steel tile. For example, the supporting part can be made into the different shapes according to different types of color steel tiles such as Type A, Type B, Type C, Type D and Type E. Furthermore, the supporting part is provided with a contact plane in touch with the surface of the color steel tile. The contact plane of the supporting part, also called as footing plane, can further stabilize the structure.

Further, the limit part, the clamping assembly, the connecting block and the connecting part are made of, but not limited to, aluminum or resin. The resin such as thermosetting resin (epoxy resin for example) can be used to prepare the limit part, the clamping assembly, the connecting block and the connecting part.

Further, the arc groove has an opening of 20-70 degrees so that the turning radian of the clamping part relative to the connecting block is kept at 70 degrees, preferably 40-50 degrees. The turning radian determines the opening of the clamping part. A preferable choice will make the clamping structure reach the excellent stable state.

In conclusion,

1. The Invention provides a bidirectional transverse clamping force. Affected by long-term wind load and snow load, the slope is subject to the additional downward applied force and the fixture becomes tighter and tighter, leading to stable and good effect for long-term application.

2. With low cost and simple processing and manufacturing process, the color steel tile fixture in the Invention can be applied for various color steel tiles in different shapes as the applied vertical force is turned into transverse force, and it is not likely to damage the surface of the color steel tile.

BRIEF DESCRIPTION OF THE DRAWINGS

In order to illustrate the technical solution in the embodiments of the invention or in prior art more clearly, the drawings required in description of the embodiments or prior art will be introduced briefly as follows. Obviously, the drawings described below are just a part of the embodiments of the invention. A person skilled in the art is able to obtain other drawings according to these drawings without any creative work.

DETAILED DESCRIPTION OF THE PREFERRED EMBODIMENTS

A clear and full description of the technical schemes in the embodiments of the Invention will be given in combination of the drawings in the embodiments of the Invention as follows. Obviously, the described embodiments are just preferable ones rather than the whole embodiments of the Invention. Based on the embodiments of the Invention, any other embodiments obtained by a person skilled in the art without any creative work will fall within the protection scope of the Invention.

Embodiment 1

Figure 1:
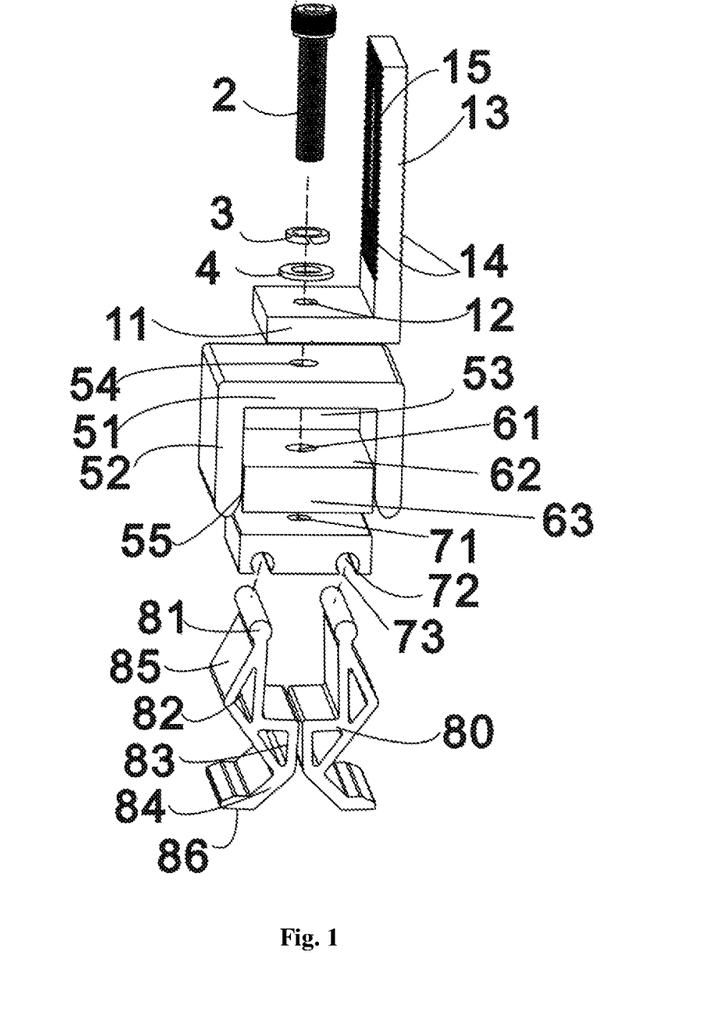
FIG. 1 is an explosive view of the color steel tile fixture in Embodiment 1.
Figure 2:
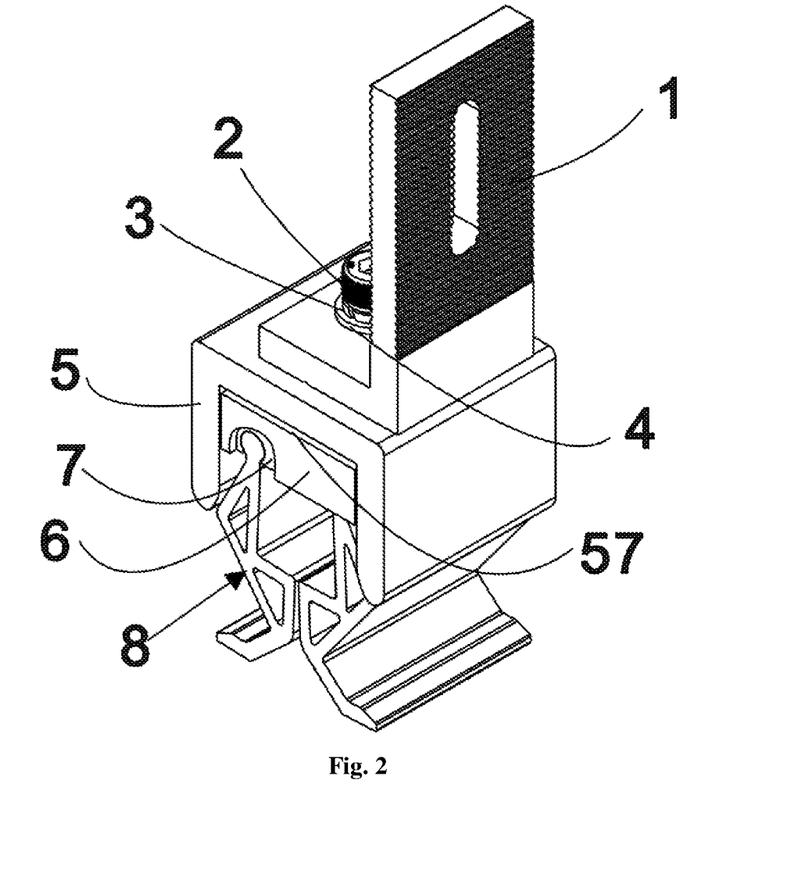
FIG. 2 is a composite structure diagram of the color steel tile fixture in Embodiment 1; in case of combination, the part where the arc groove is blocked by the stop baffle will be separated to show the arc groove of the connecting block.

Referring to FIG. 1 and FIG. 2, a color steel tile fixture comprises an L-shaped connecting part 1, a bolt 2, an elastic washer 3, a flat washer 4, a reversed U-shaped limit part 5, a stopper 6, a connecting block 7 and a clamping assembly 8.

The limit part 5, the clamping assembly 8, the connecting block 7 and the connecting part 1 are made of aluminum.

The transverse end 11 of the connecting part 1 is provided with the third through-hole 12, while the vertical end 13 is provided with the waved surface 14 and the fourth through-hole 15.

The limit part 5 comprises the transverse panel 51 and the two side panels 52 on both sides of the transverse panel 51. The two side panels 52 and the transverse panel 51 form the limit groove 53 together. The two side panels 52 are the groove arms 52 of the limit groove 53; the transverse panel 51 is provided with a first through-hole 54. The sloped or arc-structure bump 55 is provided on the tail end of interior side panel 52.

The stop 6 comprises the cover plate 62 with a second through-hole 61 and the two baffles 63 on both ends of the cover plate 62. The cover plate 62 and the two baffles 63 also form a reverse U shape.

The connecting block 7 is provided with a threaded hole 71 in the middle and two opposite arc grooves 72 on the lower end; the opening 73 of the arc groove is kept at 40-50 degrees.

The clamping assembly 8 comprises two opposite clamping parts 80 which are equipped with a clamping head 81, a bump 82, a clamping splice 83 and a supporting part 84, wherein, the clamping head 81, the bump 82, the clamping splice 83 and the supporting part 84 are integrated; the bump 82 is provided with the slope 85; the plane of clamping splice 83 for clamping is flat; a contact plane 86 is provided on the bottom of the supporting part 84 to contact with the surface of the color steel tile.

The connecting part 1 is fixed on the limit part 5. The transverse end 11 of L-shaped connecting part 1 is fixed on the transverse panel 51 of the limit part 5, and the third through-hole 12 matches with the first through-hole 54 vertically.

The stopper 6 is covered on the connecting block 7. The second through-hole 61 matches with the threaded hole 71 vertically and the baffle 63 blocks out the arc groove 72; the stopper 6 and the connecting block 7 are mounted in the limit groove 51 of the limit part 5.

The clamping assembly 8 is connected to the connecting block 7. The clamping head 81 can be rotatable engaged in the arc groove 72 and the turning radian of the clamping part 80 relative to the connecting block 7 is less than 50 degrees; the slope 85 is leaned against the bump 55 on the end of the side panel.

The bolt 2 passes through the elastic washer 3, the flat washer 4, the first through-hole 54 and the second through-hole 61 in sequence, and is screwed into the threaded hole 71 of the connecting block 7.

There is a gap 57 between the connecting block 7 and the transverse panel 51 when the two clamping splices 83 are in contact with each other and clamped tightly.

Figure 3:
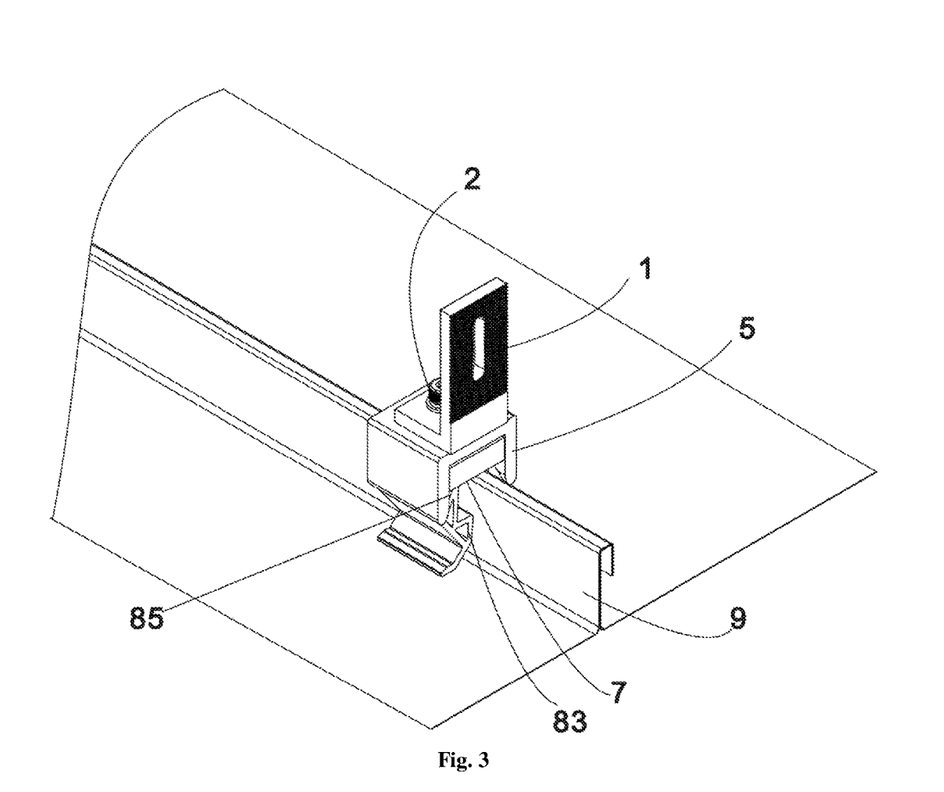
FIG. 3 is a working state diagram of the color steel tile fixture in Embodiment 1.

Referring to FIG. 3, during operation or application, the clamping splice 83 is loosened and the bump of the color steel tile 9 is placed between the clamping splices 83. When the bolt 2 is screwed, the connecting block 7 moves upward relative to the bolt 2, so that the slope 85 shrinks inward relative to the side plate 52. The applied force between the two slopes 85 and the two side panels 52 are provided with the bidirectional transverse clamping force so as to clamp the color steel tile 9.

In order to better understand the working process, the mathematical relation and applied force between the slope 85 and the groove arm 52 are used for further analysis.

Figure 4:
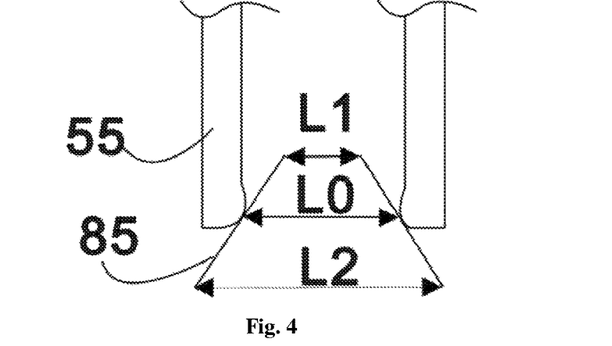
FIG. 4 is a state diagram of the slope and the side panel in the process when the color steel tile fixture is clamped or loosened in Embodiment 1.
Figure 5:
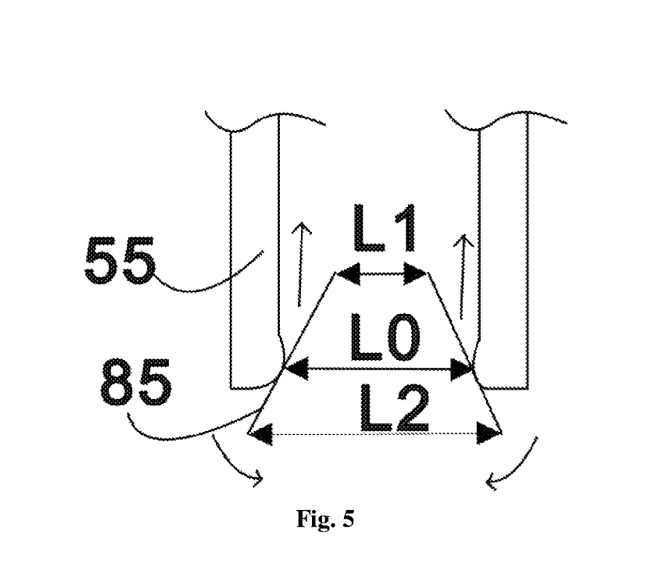
FIG. 5 is another state diagram of the slope and the side panel in the process when the color steel tile fixture is clamped or loosened in Embodiment 1.

Referring to FIG. 4, the minimum transverse space between the upper ends of the two slopes 85 is L1, the maximum transverse space between the lower ends of the two slopes 85 is L2 and the transverse space between the two contact points of the slopes 85 and the bumps 55 is L0. When L1<L0≤L2, the transverse space between the two slopes 85 above the contact point is less than L0; the transverse space between the two slopes 85 below the contact point (except when the contact point is the lowermost end of the slope 85, L0=L2) is larger than L0; referring to FIG. 4 and FIG. 5, when the slope 85 moves (the operation from FIG. 4 to FIG. 5 is to shrink inward or the operation from FIG. 5 to FIG. 4 is to stretch outward; the upward-moved arrow and inward-turned arrow in FIG. 5 represent the process from FIG. 4 to FIG. 5), the contact point gradually moves from the top to the bottom or from the bottom to the top, with the above relation always satisfied: above the contact point, the transverse space between the two slopes is less than L0; below the contact point (except when the contact point is the lowermost end of the slope 85, L0=L2), the transverse space between the two slopes is larger than L0.

Figure 6:
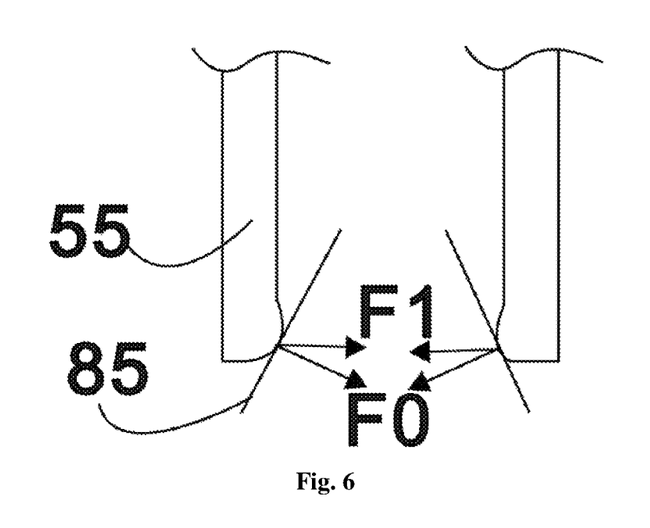
FIG. 6 is an analysis chart of the applied force between the slope and the side panel of the color steel tile fixture in Embodiment 1.

Referring to FIG. 6, a part of the applied force F0 between the slope and the groove arm is transformed into the transverse clamping force F1. Therefore, the bidirectional transverse clamping force F1 is formed in the clamping process.

In conclusion, the stable and reliable color steel tile fixture brings a good effect for long-term use and it is not likely to damage the surface of the color steel tile 9.

Embodiment 2

Figure 7:
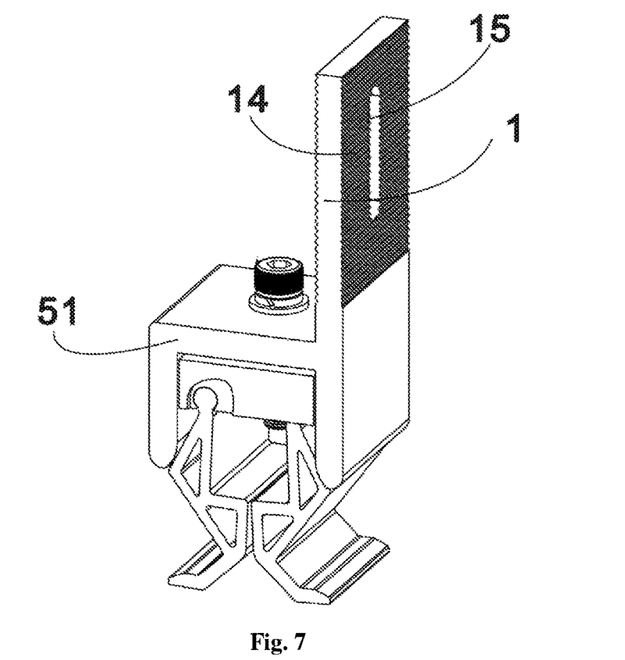
FIG. 7 is a composite structure diagram of the color steel tile fixture of Embodiment 2.

Refer to Embodiment 1. Unlike Embodiment 1, the connecting part 1 in the embodiment is an I-shaped part and integrated on the transverse panel 51 (referring to FIG. 7). The connecting part is provided with the through-hole 15 and waved surface 14.

Embodiment 3

Figure 8:
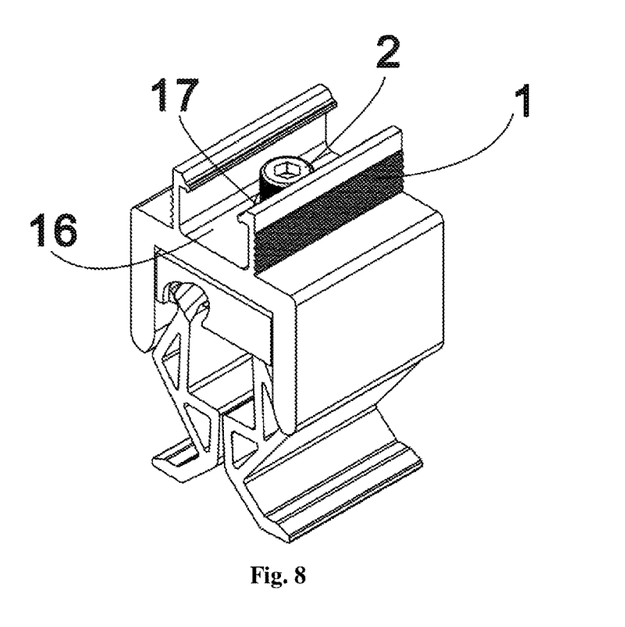
FIG. 8 is a composite structure diagram of the color steel tile fixture of Embodiment 3.

Refer to Embodiment 1. Unlike Embodiment 1, the connecting part 1 in the embodiment is a U-shaped part 1 with the U-shaped groove 16 and the U-shaped part is integrated on the transverse panel 51 (referring to FIG. 8). The fifth through-hole is provided in the U-shaped groove 16 and matches with the first through-hole 54 vertically. The bolt 2 is screwed into the threaded hole 71 through the fifth through-hole 17, the first through-hole 54 and the second through-hole 61 in sequence.

It should be understood that although the specification is made based on the above embodiments, not every embodiment contains only one unique technical solution. The specification is described in such way only for clearness. A person skilled in the art should regard the specification as a whole. The technical solution in every embodiment can be properly combined or replaced based on the Invention to form other embodiments that can be well understood by a person skilled in the art.

The foregoing is only practicable embodiments of the Invention, and could not limit the protection scope of the Invention. All equivalent embodiments or changes made by utilizing the technical solutions of the specification should be included within the protection scope of the Invention.

What is claimed is:

1. A color steel tile fixture comprising:
a limit part having a limit groove defined by a transverse panel and two side panels;
a clamping assembly, comprising two opposite clamping parts which are each equipped with, from top to bottom in sequence:
a clamping head,
a bump defining a slope, and
a clamping splice;
a connecting block, which is housed in the limit groove, is provided with a threaded hole and two opposite arc grooves on either side of the threaded hole; the clamping head of each clamping part is rotatably engaged in a respective arc groove of the two opposite arc grooves;
a threaded part, which is screwed into the threaded hole;

wherein when the threaded part is screwed, the connecting block moves upward along the threaded part within the limit part causing the side panels to engage the slopes of the bumps, so that the clamping parts are biased inwardly such that the clamping splices are configured to clamp a color steel tile; and a connecting part, which is attached to the limit part.

2. The color steel tile fixture according to claim 1, wherein, the threaded part is a bolt.

3. The color steel tile fixture according to claim 2, wherein, the transverse panel is provided with a first through-hole, the bolt is screwed into the threaded hole through the first through-hole.

4. The color steel tile fixture according to claim 3, wherein, there is a gap between the connecting block and the transverse panel when the two clamping splices are in contact with each other and clamped tightly.

5. The color steel tile fixture according to claim 3, wherein, a sloped or an arc-shaped bump on the end of each side panel inward is provided, and the slope of each clamping part is configured to engage a respective bump of each side panel.

6. The color steel tile fixture according to claim 3, wherein, a stopper is provided, comprising a cover plate with a second through-hole and two baffles on both ends of the cover plate; the cover plate is placed on the connecting block; and the second through-hole matches with the threaded hole vertically and the baffles block out the arc grooves.

7. The color steel tile fixture according to claim 3, wherein, the connecting part is an L-shaped part of which a transverse end is fixed on the transverse panel, the transverse end is provided with a third through-hole which matches with the first through-hole vertically, and a vertical end of the connecting part is provided with a waved surface and a fourth through-hole.

8. The color steel tile fixture according to claim 3, wherein, the connecting part is an I-shaped part and integrated on the transverse panel.

9. The color steel tile fixture according to claim 3, wherein, the connecting part is a U-shaped part with a U-shaped groove, the U-shaped part is integrated on the transverse panel; a fifth through-hole is provided inside the U-shaped groove and matches with the first through-hole vertically, and the bolt is screwed through the fifth and the first through-holes in sequence.

10. The color steel tile fixture according to claim 3, wherein, a flat washer and an elastic washer are further provided, the threaded part is screwed into the threaded hole through the elastic washer, the flat washer and the first through-hole in sequence.

11. The color steel tile fixture according to claim 1, wherein, a place where the clamping splice is used is a point, a line or a surface; the point is a large convex point or several small convex points; the line is a continuous line or several broken lines; and the surface is a flat surface or a serrated surface.

12. The color steel tile fixture according to claim 1, wherein, the clamping part is provided with a supporting part which is integrated under the clamping splice.

13. The color steel tile fixture according to claim 12, wherein, the supporting part is provided with a contact plane which is configured to be in touch with a surface of a color steel tile.

14. The color steel tile fixture according to claim 1, wherein, the limit part, the clamping assembly, the connecting block and the connecting part are made of aluminum or resin.

15. The color steel tile fixture according to claim 1, wherein, the arc groove has an opening of 20-70 degrees so that the turning radius of said clamping parts relative to the connecting block is kept at 70 degrees.

* * * * *